United States Patent
Schaefer et al.

(10) Patent No.: US 9,851,123 B2
(45) Date of Patent: Dec. 26, 2017

(54) FLAP DEVICE FOR AN INTERNAL COMBUSTION ENGINE OR AN ELECTRIC VEHICLE

(71) Applicant: PIERBURG GMBH, Neuss (DE)

(72) Inventors: Michael Schaefer, Kremmen (DE); Ralf Neise, Berlin (DE); Marc-Anton Muenich, Potsdam (DE); Michael Glaesser, Berlin (DE); Lars Heinemann, Berlin (DE)

(73) Assignee: PIERBURG GMBH, Neuss (DE)

( * ) Notice: Subject to any disclaimer, the term of this patent is extended or adjusted under 35 U.S.C. 154(b) by 244 days.

(21) Appl. No.: 14/441,180

(22) PCT Filed: Sep. 3, 2013

(86) PCT No.: PCT/EP2013/068158
§ 371 (c)(1),
(2) Date: May 7, 2015

(87) PCT Pub. No.: WO2014/072094
PCT Pub. Date: May 15, 2014

(65) Prior Publication Data
US 2015/0300679 A1    Oct. 22, 2015

(30) Foreign Application Priority Data
Nov. 9, 2012 (DE) .......... 10 2012 110 763

(51) Int. Cl.
F24F 13/14    (2006.01)
F02D 9/10    (2006.01)
F16K 1/22    (2006.01)

(52) U.S. Cl.
CPC .......... *F24F 13/1426* (2013.01); *F02D 9/106* (2013.01); *F16K 1/224* (2013.01); *F02D 9/107* (2013.01); *F02D 9/108* (2013.01)

(58) Field of Classification Search
CPC ...... F24F 13/1426; F02D 9/106; F02D 9/107; F02D 9/108; F16K 1/224
(Continued)

(56) References Cited

U.S. PATENT DOCUMENTS 3,341,170 A    9/1967    Housworth
3,778,028 A    12/1973    Graves et al.
(Continued)

FOREIGN PATENT DOCUMENTS

CI    I350516 A    11/1960
CN    102182563 A    9/2011
(Continued)

OTHER PUBLICATIONS

Bennett, Plain Bearings Outperform Rolling-Element Bearings, Machine Design, Apr. 7, 2009.*

*Primary Examiner* — Gregory Huson
*Assistant Examiner* — Dana Tighe
(74) *Attorney, Agent, or Firm* — Norman B. Thot

(57) ABSTRACT

A flap device for an internal combustion engine or an electric vehicle includes a flap body comprising a receiving opening, a duct housing configured to rotate arranged in the flap body, an actuator, a first bearing, a stub shaft arranged to project from the actuator through the duct housing to the flap body, a slide bearing arranged in the receiving opening of the flap body, and an axial pin arranged so as to be fixed in the duct housing on a side of the flap body opposite to the stub shaft. The stub shaft is supported in the duct housing via the first bearing. The axial pin supports the flap body via the slide bearing and projects into the receiving opening.

15 Claims, 2 Drawing Sheets

(58) Field of Classification Search
USPC .................................. 454/145, 333, 334, 358
See application file for complete search history.

(56) References Cited

U.S. PATENT DOCUMENTS

| | | | |
|---|---|---|---|
| 3,958,595 A | 5/1976 | Al et al. | |
| 4,513,771 A | 4/1985 | Thomas et al. | |
| 5,226,630 A | 7/1993 | Haseley et al. | |
| 5,342,019 A * | 8/1994 | Braun | F02B 37/22 |
| | | | 137/315.22 |
| 5,695,170 A | 12/1997 | Dernovsek et al. | |
| 6,386,178 B1 | 5/2002 | Rauch | |
| 6,863,259 B2 * | 3/2005 | Torii | F02D 11/10 |
| | | | 251/305 |
| 2004/0211391 A1 | 10/2004 | Bender | |
| 2005/0016602 A1 | 1/2005 | Schub et al. | |
| 2009/0317031 A1 * | 12/2009 | Pfundt | F02D 9/04 |
| | | | 384/569 |
| 2010/0237269 A1 | 9/2010 | Furukawa et al. | |

FOREIGN PATENT DOCUMENTS

| | | |
|---|---|---|
| DE | 966 300 C | 7/1957 |
| DE | 1 282 381 B | 3/1969 |
| DE | 26 32 289 A1 | 1/1978 |
| DE | 42 36 144 A1 | 4/1994 |
| DE | 44 23 370 A1 | 1/1996 |
| DE | 195 26 143 A1 | 1/1997 |
| DE | 10 2006 054 041 B3 | 5/2008 |
| DE | 10 2007 013 937 A1 | 12/2008 |
| DE | 10 2010 011 728 A1 | 9/2010 |
| EP | 0 498 536 A2 | 8/1992 |
| EP | 1 170 484 A2 | 1/2002 |
| EP | 1 970 606 A1 | 9/2008 |
| EP | 1 486 655 B1 | 12/2010 |
| WO | WO 03/046419 A1 | 6/2003 |

* cited by examiner

FLAP DEVICE FOR AN INTERNAL COMBUSTION ENGINE OR AN ELECTRIC VEHICLE

CROSS REFERENCE TO PRIOR APPLICATIONS

This application is a U.S. National Phase application under 35 U.S.C. §371 of International Application No. PCT/EP2013/068158, filed on Sep. 3, 2013 and which claims benefit to German Patent Application No. 10 2012 110 763.7, filed on Nov. 9, 2012. The International Application was published in German on May 15, 2014 as WO 2014/072094 A1 under PCT Article 21(2).

FIELD

The present invention relates to a flap device for an internal combustion engine or an electric vehicle, comprising a flap body, a duct housing in which the flap body is arranged in a rotatable manner, an actuator, and a stub shaft which projects from the actuator through the duct housing to the flap body and is supported in the duct housing via a first bearing.

BACKGROUND

Flap devices of the above type are known in particular as throttle flaps for controlling the air supply to the internal combustion engine. In the process, the flap will be rotated in the duct housing, whereby the available flow cross section will be changed. Other applications for control of a gas flow, particularly of an air or exhaust gas flow, are also, however, known.

Various types of supports and designs of these flaps have been disclosed. In most cases, such flaps, which can be produced from plastic or metal, comprise a throughgoing shaft which is supported on both sides of the flap body in the duct housing. Primarily rolling bearings and, in this case, ball bearings are used for support. While the first shaft end is mostly supported in a blind hole of the duct housing, the opposite end passes through the duct housing. On this shaft end, a toothed wheel of a transmission is normally supported via which a connection to an electric motor is established, the electric motor serving as an actuator to drive the flap body and being connected to the control unit of the internal combustion engine.

Such a throttle body is described, for example, in DE 10 2007 013 937 A1. The rotary shaft, connected to the electric motor via the transmission, is supported in the duct housing by means of two needle bearings which include sealing rings.

DE 44 23 370 A1 describes a throttle flap made of plastic which comprises two opposite receiving openings for two shaft ends which are held in the openings in a form-locking manner. The flap body comprises rotary-bearing sites which are surrounded by a soft plastic sealing. DE 44 23 370 A1 does not disclose how the bearing support in the stub is actually realized.

The known designs have the disadvantage that the assembly process is relatively bothersome and that a high dimensional accuracy or additional measures are required in order the provide an exact position of the flap body when mounting the flap body in the duct in the direction of the axis of rotation. These designs are further vulnerable towards corrosive condensates.

SUMMARY

An aspect of the present invention is to provide a flap device which can be produced and assembled at a favorable cost and which can be precisely located in the duct in a convenient manner without requiring additional measures. An additional aspect of the present invention is that the bearings should be protected from corrosive condensates in the best possible manner.

In an embodiment, the present invention provides a flap device for an internal combustion engine or an electric vehicle which includes a flap body comprising a receiving opening, a duct housing configured to rotate arranged in the flap body, an actuator, a first bearing, a stub shaft arranged to project from the actuator through the duct housing to the flap body, a slide bearing arranged in the receiving opening of the flap body, and an axial pin arranged so as to be fixed in the duct housing on a side of the flap body opposite to the stub shaft. The stub shaft is supported in the duct housing via the first bearing. The axial pin is configured to support the flap body via the slide bearing and to project into the receiving opening.

BRIEF DESCRIPTION OF THE DRAWINGS

The present invention is described in greater detail below on the basis of embodiments and of the drawings in which.

DETAILED DESCRIPTION

Figure 1:
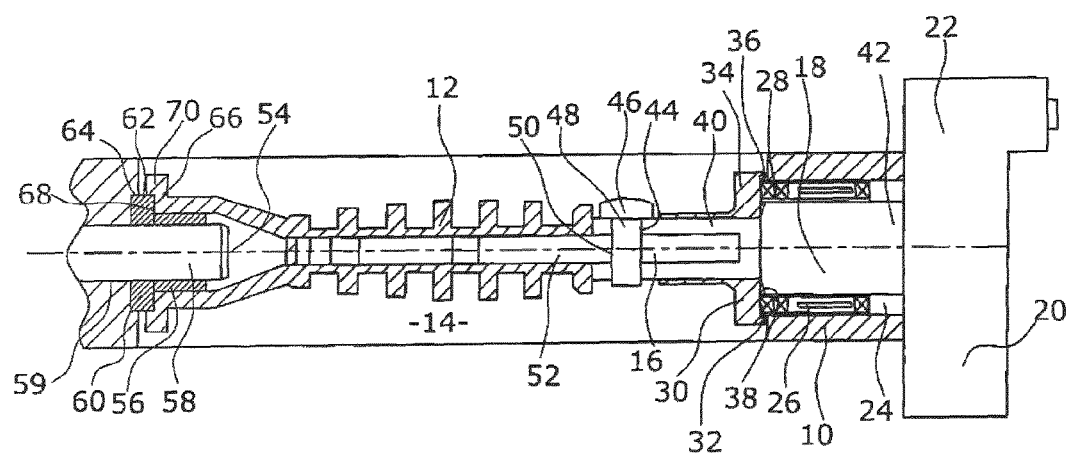
FIG. 1 shows a three-dimensional representation of a flap device according to the present invention depicting the duct housing in a sectional view at the level of the axis of rotation, and depicting the flap body in a lateral view.
Figure 2:
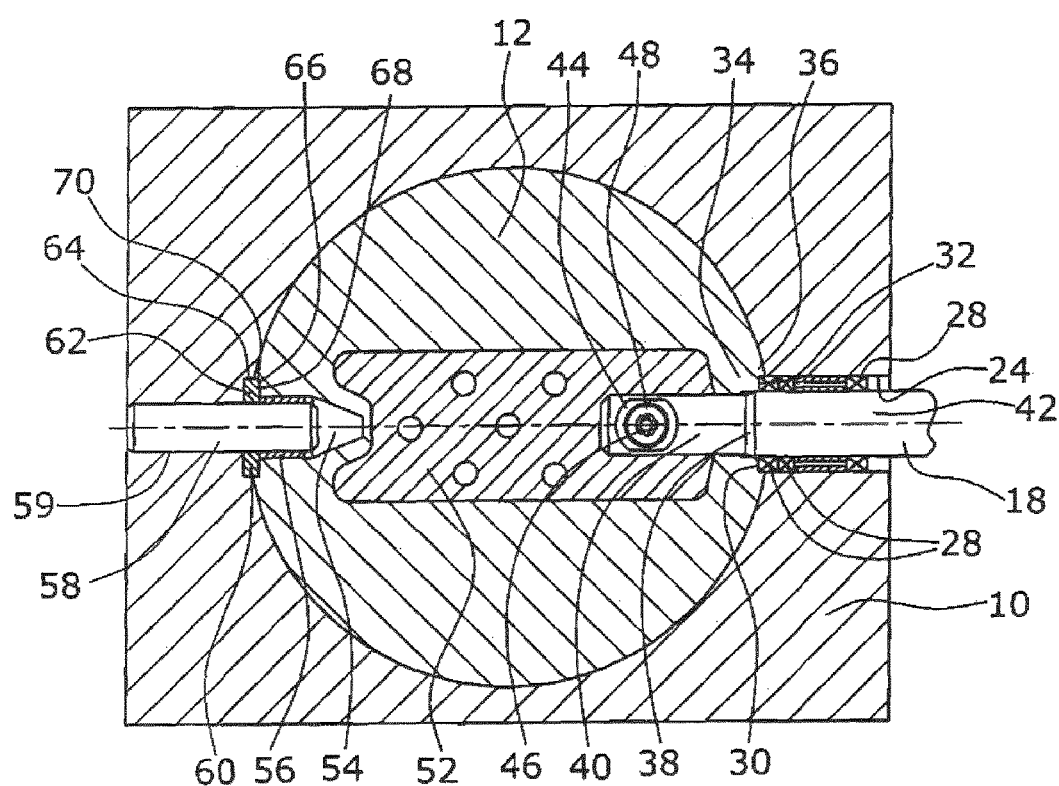
FIG. 2 shows a plan view onto the flap device in a fully sectional representation.

Because an axial pin is fixedly arranged in the duct housing on the side of the flap body opposite the stub shaft, on which pin the flap body is supported via a slide bearing arranged in a receiving opening of the flap body, with the axial pin extending into the receiving opening, there is achieved a particularly simple assembly process because the axial pin and the stub shaft can be inserted into the duct housing from axially opposite sides. The entire arrangement can thus be assembled from the outside in a simple manner. In addition thereto, ingress of condensate in the area of the slide bearing in case of inclined mounting positions is reliably prevented. With this design, the slide bearing cannot only be pressed in at a later time, as has already been common practice, but can also be produced by surrounding injection or be directly formed from the plastic used.

It is advantageous if the axial pin is pressed in internally of the duct housing so that no further sealings need to be provided on the side of the axial pin to provide a sealing tightness toward the outside. By being fastened in the duct housing, the axial pin is not subjected to any alternating bending.

In an embodiment of the present invention, the first bearing can, for example, be a rolling bearing with its axial end extending into the duct and being in abutment on an abutment face of the flap body, said abutment face delimiting a receiving ring having the stub shaft extending through it. During assembly of the stub shaft and the axial pin with the flap, it can thus be avoided that the flap might drop down before insertion of the stub shaft. A high sealing tightness toward the outside is at the same time also provided on the side of the stub shaft. The axial play of the flap in the duct can be adapted through the insertion of the rolling bearing by shifting the rolling bearing to a position which is spaced from the disk, while various disk thicknesses can be used.

It can be advantageous if the rolling bearing is a needle bearing since such a bearing has a particularly high load-bearing capacity and thus has a long operating life at high stress.

In an embodiment of the present invention, a disk can, for example, be arranged between the flap body and the duct housing, the disk radially surrounding the axial pin and being in axial abutment against an abutment face surrounding the receiving opening and against the duct housing. This disk thereby creates a planar abutment face toward the flap body in spite of the cylindrical shape of the duct housing. The flap body can be pressed against this disk by a shift-in of the rolling bearing during the assembly process. The disk serves as a washer disk in the axial direction. The arrangement of the disk around the pin of the bearing arranged in the flap will also lead to a reduction of leakage in the closed position of the flap.

In an embodiment of the present invention, a first axial section of the disk can, for example, be arranged in a recess of the duct housing, and a second axial section can, for example, extend into the duct. This provides the positioning of the disk in the duct and the functioning of the disk as a planar abutment face.

For further simplification of the assembly process and for further enhancement of the sealing tightness of the flap, a respective annular projection extends from the abutment faces to the duct housing. Prior to insertion of the axis and of the stub shaft, the flap body can thus be supported on the disk and the rolling bearing via these projections.

In correspondence thereto, the first annular projection surrounds the section of the rolling bearing extending into the duct, and the second annular projection surrounds the section of the disk extending into the duct. This will also effect an increased resistance against ingress of corrosive liquid into the region of the bearing.

In an embodiment of the present invention, the stub shaft can, for example, comprise a step which is arranged in the receiving ring of the flap body, wherein the section having a smaller diameter faces toward the flap body, thus reliably preventing damage of the seals when passing the stub shaft through the housing.

In an embodiment of the present invention, the flap body can, for example, be made of plastic and can comprise a metal plate having the plastic molded partially around it, and the stub shaft can comprise an axial slot having the metal plate of the flap body extending into it. This makes it possible to obtain a durable fastening of the flap body on the stub shaft. The contour of the flap follows the contour of the shaft in order to prevent leakage within the range of the differences of diameter.

In an embodiment of the present invention, the metal plate can, for example, be formed with a hole in which, for fastening the flap body to the first stub shaft, a screw is attached which extends through the first stub shaft into the hole of the metal plate and engages a thread in the stub shaft beyond the slot.

A further simplification of the assembly process is achieved if, at the end of the stub shaft facing toward the actuator, a tooth segment is attached by molding, which tooth segment is then connected to the further transmission and thus to the actuator.

In an embodiment of the present invention, the slide bearing can, for example, be formed in the flap body geodetically below the rolling bearing, thus excluding ingress of generated condensate into the slide bearing.

It is advantageous if the needle bearing comprises integrated sealing rings. This prevents the ingress of liquid without requiring additional assembly steps.

A flap device is thereby created which allows for a particularly simple assembly process. Possible batch variations during production of the flap body can be compensated by simple means. An exact positioning of the flap body in the duct housing is thus obtained, which leads to a relatively good sealing tightness in the closed state, and to a reduced number of rejected products in the assembly process. The flap device can further be produced at favorable costs and is not sensitive to occurring corrosive liquids.

An embodiment of the flap device of the present invention is illustrated in the drawings and will be described hereunder.

The flap device of the present invention comprises a flap body 12 which is arranged to rotate in a duct housing 10, wherein the radial dimension of the flap body 12 substantially corresponds to the free diameter of a duct 14 formed in the duct housing 10. Flap body 12 is fastened in a slot 16 of a stub shaft 18 which on its opposite end has a tooth segment (not shown) molded to it, the tooth segment being connected to a continuing transmission arranged in a transmission housing 20, while the transmission together with an electric motor forms an actuator 22 driving the flap body 12.

Duct housing 10 comprises a first bore 24 through which the stub shaft 18 extends from transmission housing 20 into the duct 14. Arranged in the first bore 24 is a rolling bearing designed as a needle bearing 26, with sealing rings 28 integrated into it on both sides.

The needle bearing 26 extends by its axial end 30 into duct 14 where it is in axial abutment against an abutment face 32 axially delimiting the flap body 12. The abutment face 32 forms the axial delimitation of flap body 12. This axial end 30 of needle bearing 26 is radially surrounded by a first annular projection 36 extending from abutment face 32 of flap body 12 in the direction of duct housing 10.

In a receiving ring 34, the stub shaft 18 is arranged which in this region comprises a step 38 so that a slotted section 40, comprising the slot 16, of stub shaft 18 facing into the interior of duct 14 has a smaller diameter than the section 42 of stub shaft 18 arranged in first bore 24.

The thinner slotted section 40 is formed with a hole 44 in which a head 46 of a screw 48 is arranged, the screw 48 clamping a metal plate 52 via the shaft slot and an opposite thread. The metal plate 52 is a part of flap body 12 and, prior to molding, will be inserted in the tool for forming the flap body 12 and then will be enclosed by molding material. The slotted section 40 of stub shaft 18 is arranged in abutment against this metal plate 52 on both sides and thus establishes the fixed connection between flap body 12 and stub shaft 18.

On the side axially opposite to the receiving ring 34, the flap body 12 comprises a receiving opening 54 in which a slide bearing 56 is arranged. This slide bearing 56 can either be inserted into the tool prior to the molding of flap body 12 or can be formed by the material itself, or be molded in at a later time. The slide bearing 56 radially surrounds an axial pin 58 whose opposite end is fastened in a second bore 59, arranged opposite to the first bore 24, within the duct housing 10.

A disk 60 is arranged between duct housing 10 and slide bearing 56, as viewed in the direction of the axis of rotation, whose first axial section 62 is located in a correspondingly shaped recess 64 in the wall of duct housing 10 and whose second axial section 66 extends into duct 14 and is in axial abutment against an abutment face 68 which radially delimits the receiving opening 54. This second axial section 66 is radially surrounded by a second annular projection 70 extending from the abutment face 68 in the direction of duct housing 10.

The special advantages of this flap device become clear in the assembly process, particularly if the part of the flap body 12 with the slide bearing 56 is arranged geodetically below the part supported via the needle bearing 26. After producing the duct housing 10 with the bores 24, 59 and the molding of the flap body 12 with the metal plate 52, the slide bearing 56 is first pressed into the receiving opening 54 unless it was already produced along with the molding process for the flap body 12.

The disk 60 will subsequently be placed in the recess 64 of duct housing 10, which, due to the geodetic position, is particularly simple. The flap body 12 will be placed in the duct 14 in so that the second annular projection 70 will surround the disk 60 and the abutment surface 68 will be in abutment on disk 60. The needle bearing 26 will be pressed in at a distance from disk 60. This distance corresponds to the flap thickness and the temperature-dependent minimum play. The axial pin 58 will then be inserted through the second bore 59 into the receiving opening 54 and through the slide bearing 56, wherein, by press fit of axial pin 58 within second bore 59, a sealing effect toward the outside can be generated. From the opposite side, the stub shaft 18 will be shifted through the first bore 24, and respectively the needle bearing 26, as well as through the receiving ring 34, notably so that the metal plate 52 will come to rest in the slot 16 of stub shaft 18.

The flap body 12 with metal plate 52 as well as the stub shaft 18 can be rotated for this purpose. The flap body 12 will subsequently be screwed by the screw 48 through the hole 44 of the stub shaft 18 and thereby be clamped with the aid of the shaft slot.

By use of favorably priced component parts, there is thus created a flap device which can be assembled with low expenditure. The position of the flap can be optimized in the duct so that batch variations can be compensated for. Particularly in case of an inclined installation position, no condensate will intrude into the slide bearing so that the operating life of the bearings is distinctly increased because, under the effect of gravity, the condensate will run out of both slide bearings.

It should be evident that the scope of protection of the main claim is not delimited to the above described exemplary embodiment but that various constructional modifications can be envisioned; reference should also be had to the appended claims. Connections may in particular be realized in a detachable or non-detachable manner. The design of the individual component parts can of course be adapted to the respective purpose.

What is claimed is:

1. A flap device for an internal combustion engine or an electric vehicle, the flap device comprising:
 a flap body comprising a receiving opening;
 a duct housing configured to have the flap body rotate therein;
 an actuator;
 a first bearing;
 a stub shaft arranged to project from the actuator through the duct housing to the flap body, the stub shaft being supported in the duct housing via the first bearing;
 a slide bearing arranged in the receiving opening of the flap body; and
 an axial pin arranged so as to be fixed in the duct housing on a side of the flap body opposite to the stub shaft, the axial pin being configured to support the flap body via the slide bearing and to project into the receiving opening.

2. The flap device as recited in claim 1, wherein the axial pin is press-fitted in the duct housing.

3. The flap device as recited in claim 1, further comprising:
 a receiving ring configured to have the stub shaft extend therethrough,
 wherein,
 the duct housing comprises a duct,
 the flap body further comprises a flap body abutment face, the abutment face being configured to axially limit the receiving ring, and
 the first bearing is a rolling bearing comprising an axial end arranged to extend into the duct and to abut on the flap body abutment face of the flap body.

4. The flap device as recited in claim 3, wherein the rolling bearing is a needle bearing.

5. The flap device as recited in claim 4, wherein the needle bearing comprises integrated sealing rings.

6. The flap device as recited in claim 3, further comprising:
 a receiving opening abutment face configured to surround the receiving opening; and
 a disk arranged between the flap body and the duct housing,
 wherein,
 the disk is configured to partially radially surround the axial pin and to axially abut against the receiving opening abutment face and against the duct housing.

7. The flap device as recited in claim 6, wherein,
 the duct housing comprises a recess, and
 the disk comprises a first axial section and a second axial section, the first axial section being arranged in the recess of the duct housing, and the second axial section being configured to extend into the duct.

8. The flap device as recited in claim 6, further comprising:
 a first annular projection configured to extend from the flap body abutment face axially to the duct housing; and
 a second annular projection configured to extend from the receiving opening abutment face axially to the duct housing.

9. The flap device as recited in claim 8, wherein the first annular projection is further configured to surround a section of the first bearing which extends into the duct.

10. The flap device as recited in claim 8, wherein the second annular projection is further configured to surround a section of the disk which extends into the duct.

11. The flap device as recited in claim 8, wherein the stub shaft comprises a step arranged in the receiving ring of the flap body, and a first section arranged to face the flap body.

12. The flap device as recited in claim 1, wherein,
 the flap body is made of plastic and further comprises a metal plate arranged so that the plastic is molded so as to partially surround the metal plate, and
 the stub shaft comprises an axial slot configured to have the metal plate of the flap body extend therein.

13. The flap device as recited in claim 12, further comprising:
 a screw,
 wherein,
 the stub shaft further comprises a thread,
 the metal plate comprises a hole configured to have the screw pass therethrough, and the screw is configured to pass through the stub shaft and through the hole in the metal plate so as to engage the thread in the stub shaft beyond the axial slot.

14. The flap device as recited in claim 1, further comprising, a tooth segment arranged by a molding at an end of the stub shaft facing the actuator.

15. The flap device as recited in claim 1, wherein the slide bearing is formed in the flap body geodetically below the first bearing.

* * * * *